Patented Jan. 15, 1952

UNITED STATES PATENT OFFICE 2,582,258

PREPARATION AND DEGRADATION OF STEROID AMINES

Percy L. Julian, Maywood, Edwin W. Meyer and Ralph Schroeder, Chicago, Ill., and Arthur Magnani, Wilmette, Ill., assignors to The Glidden Company, Cleveland, Ohio, a corporation of Ohio No Drawing. Application September 17, 1949, Serial No. 116,417

20 Claims. (Cl. 260—397.3)

This invention relates to the preparation and degradation of steroid amines, particularly such amines wherein the amino group is at the 17-position or is a part of an alkyl substituent at the 17-position of the steroid nucleus.

The degradation of steroid acids, either natural or synthetic, has become an integral part of the preparation and production of certain hormonal products for therapeutic usage. Various schemes have been proposed and a limited number of these have been found economically feasible for commercial production. One such process is exemplified by U. S. Patents Nos. 2,108,646 and 2,286,892. This process involves conversion of the steroid acid to the primary amine by a Curtius degradation, and subsequent degradation of this amine via the N-chloro derivative to a carbonyl compound having one less carbon atom than the original acid.

This latter step, namely, the conversion of the primary amine to the carbonyl compound, presents some difficulties which detract from the full economic value of the process. In practice it is impossible to control the conditions of chlorination of primary amine with hypochlorite in such a manner as to bring about complete monochlorination (Eq. 1) to the exclusion of dichlorination (Eq. 2).

(1)  $RNH_2 \rightarrow RNHCl$
(2)  $RNH_2 \rightarrow RNCl_2$

Treatment of the monochlor compound with alkali to remove the elements of HCl leads to an imine hydrolyzable to the carbonyl product. However, the dichloroamine under similar conditions gives rise to dark materials from which it is difficult to isolate the carbonyl compound in relatively pure form. Also the yield of carbonyl compounds from the dichloro amine is much less than from the monochloramine. Even in the instance that a stoichiometric quantity of hypochlorite for monochlorination is employed, the resulting material will contain monochloramine, dichloramine and unchanged primary amine. Here difficulty arises not only from the presence of the dichloramine but also because of the presence of the primary amine, since under alkaline conditions this reacts with formed carbonyl compound to form resinous materials, thus further lowering the final yield of carbonyl compound and hindering its isolation.

It is accordingly an object of the present invention to provide an improved process for converting primary steroid amines to carbonyl compounds.

A further object is to provide a process for converting primary steroid amines to carbonyl compounds which avoids the formation of N-dichloroamines.

An additional object is to prevent condensation of unreacted primary amines with carbonyl compounds in the conversion of primary steroid amines to carbonyl compounds.

Another object is to provide new intermediates in the production of valuable steroid hormones.

Still another object is to provide a method for preparing such intermediates.

Other objects will be apparent from the following description:

In accordance with the present invention the primary amine is converted to the mono-alkyl amine, which may then be treated with hypochlorite to form the N-chloro derivative which is then degraded under alkaline conditions to remove HCl and hydrolyzed to the carbonyl compound. The use of the mono-alkyl amine obviates all of the difficulties arising from the formation of dichloramine, since in the monoalkylated amine there is only one hydrogen atom replaceable by chlorine, and therefore only the mono-N-chloro compounds can be formed. Since it has been found that the monoalkyl monochloramine can be readily converted to the monoalkyl imine, which on hydrolysis readily yields a carbonyl compound in a reaction mixture which is relatively free of those by-products which hinder its isolation, it is seen that this method provides an improved procedure for the conversion of the primary amine to the carbonyl compound.

It has been found that the monoalkyl amine can be readily formed by the so-called "Decker Method," Decker and Becker; Ann. 395; 362–376 (1913). This procedure involves treatment of the aldimine formed by reaction of the primary amine with an aromatic aldehyde with an alkyl halide, followed by hydrolysis of the resulting quaternary immonium compound. Preparation of these aldimines is described in application Serial No. 771,136, now U. S. Patent 2,566,366.

The typical reactions involved may be illustrated in the following equations for the conversion of $\Delta^5$ - 3 - hydroxy - ternorcholenylamine to pregnenolone, in which equations R represents the 3-hydroxy-$\Delta^5$-etiocholenyl radical.

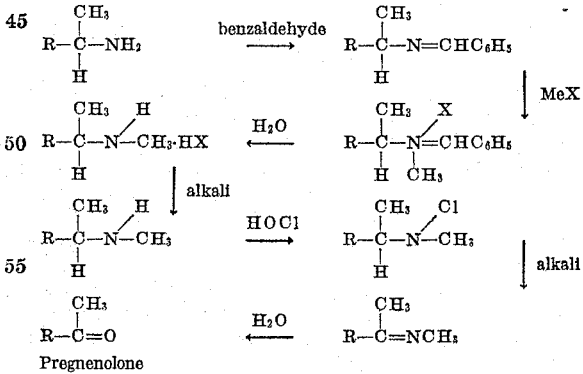

Pregnenolone

The following examples are illustrative:

EXAMPLE I

20-methylamino-5-pregnene-3β-ol

A mixture of 10 g. of 20-benzalimino-5-pregnene-3β-ol (preparation described in application Serial No. 771,136), 15 cc. of methyl iodide and 15 cc. of benzene was heated in a sealed tube at 95–100° C. for four hours. The resulting mass of crystals was filtered, washed with benzene and dried. The yellow crystals of quaternary halide were dissolved in 100 cc. of methanol made slightly acidic with concentrated aqueous hydrochloric acid. The mixture was steam distilled to remove benzaldehyde, made alkaline and the crude product filtered from the aqueous slurry M. P. 215–220° C. Pure 20-methylamino-5-pregnene-3β-ol was obtained by recrystallizing the crude product from chloroform and from methanol, white prisms, M. P. 225–226° C.

EXAMPLE II

20-methylamino-5-pregnene-3β-ol

In much the same fashion as described in Example I, 20-benzalimino-5-pregnene-3β-ol was treated with a benzene solution of methyl bromide. The product after alkaline hydrolysis was 20-methylamino-5-pregnene-3β-ol.

EXAMPLE III

20-methylamino-5-pregnene-3β-ol acetate and hypochlorite degradation

A mixture of 4.5 g. of the benzal derivative of 20-amino-5-pregene-3β-ol acetate and 12 g. of methyl iodide was heated at 100° for two hours in a sealed tube. After cooling, the partially crystalline mixture was removed from the tube, diluted with ethanol, and then heated to remove methyl iodide, excess alcohol and to effect cleavage. The resulting mixture was diluted with water and extracted with ether. The ethereal solution was dried and concentrated to the point of crystallization of the desired methylamine.

A solution of 2.2 g. of this amine in 20 cc. of anhydrous ethanol was cooled to 0–5° and treated, with agitation, with 15 cc. of a dry ethereal solution of HOCl (0.333 g. of HOCl). There was then added a solution of 0.8 g. of sodium in 13 cc. of absolute ethanol. The ether was removed by distillation and the residue was refluxed for one hour. After acidification with 20 cc. of 10% sulfuric acid, the mixture was allowed to stand overnight and then extracted with ether. The ether layer was washed with alkali and water. After removal of ether, the residue upon crystalliaztion from toluene gave pregnenolone, M. P. 180–184°.

EXAMPLE IV

Isolation of 20-N-chloromethylamino-5-pregnene-3β-ol

A hot solution of 3.3 g. of the methylamine of Example I in 175 cc. of methanol was treated with 6.8 cc. of sodium hypochlorite solution (containing 0.011 mole of NaOCl by titration). Immediately a white solid separated. After chilling in an ice bath and diluting with water, the fine crystalline solid was separated by filtration, washed with water till free of alkali and dried. The white solid melted at 134–137° with decomposition. Titration (KI—$Na_2S_2O_3$) indicated that this material contained 93% of the desired chloro-amine.

EXAMPLE V

Hypochlorite degradation of 20-methylamine-5-pregnene-3β-ol

With mechanical agitation and heating, 5.4 g. of 20-methylamine-5-pregnene-3β-ol was dissolved in a solution of 3.6 g. of potassium hydroxide in 250 cc. of methanol. To the vigorously stirring and refluxing solution, 10.2 cc. of sodium hypochlorite solution (one molar equivalent) diluted to 25 cc. with water was added dropwise over a period of ten minutes. The addition of one molar equivalent of hypochlorite was repeated three times with ten minutes for addition and ten minutes reflux period before the addition of the next quantity. After the last addition (four in all), the solution was stirred and refluxed for forty-five minutes, then cautiously acidified with 10 cc. of concentrated $H_2SO_4$—60 cc. water and allowed to stand overnight. The mixture was diluted with water and extracted with ether. The ethereal layer was washed with water, 5% sodium hydroxide solution, water and dried. Concentration of this solution gave a crystalline mass which when triturated with ether gave crude pregnenolone. A further quantity of pregnenolone was isolated from the ether washes by separation of the semicarbazone and subsequent hydrolysis. The pregnenolone was purified by recrystallization from toluene, M. P. 185–187°.

EXAMPLE VI

20-methylamine-4-pregnene-3-one

A solution of 11.7 g. of 20-methylamino-5-pregnene-3β-ol in 555 cc. of toluene and 114 cc. of cyclohexanone was distilled until all moisture had been removed. To the hot solution, a solution of 6.0 g. of alumnium isopropoxide in 52 cc. of toluene was added dropwise over a five-minute period. The mixture was refluxed for an additional thirty minutes, decomposed with 10 cc. of acetic acid in 25 cc. of toluene, and then steam distilled. The residue was made strongly alkaline with 10% sodium hydroxide solution and extracted with ether. The extract was washed with water and dried. From the concentrated solution, there crystallized 9.4 g. of the 3-keto derivative, M. P. 165–170°. Another crop of material can be obtained from the mother liquor. Recrystallization of a sample from benzene-petroleum ether (B. P. 35–60°) gave the pure material as pale yellow prisms melting at 168–169.5°.

EXAMPLE VII

Hypochlorite degradation of 20-methylamino-4-pregnene-3-one

A solution of 0.019 mole of 20-methylamino-4-pregnene-3-one in 80 cc. of aqueous hydrochloric acid was made alkaline with 40 cc. of 10% sodium hydroxide solution and then added to a solution of 10 g. of potassium hydroxide in 400 cc. of methanol. This mixture was stirred vigorously and boiled under reflux during the addition of 55 cc. of an aqueous sodium hypochlorite solution over a period of ten minutes. After another ten minutes of heating, the reaction mixture was acidified with a solution of 20 cc. of concentrated sulfuric acid in 325 cc. of water. It was allowed to stand overnight, and then concentrated in partial vacuum to one-half volume. After dilution with water, the mixture was extracted with ether. The ethereal extract was washed with water, dilute sodium hydroxide solution, and then with water till free of alkali.

Concentration of the dried ether solution gave 3.4 g. of crude progesterone. The progesterone was purified by recrystallization from ether-petroleum ether (B. P. 35–60° C.).

EXAMPLE VIII

*17-methylamino-5-androstene-3β-ol*

A mixture of 10 g. of 17-benzalimino-5-androstene-3β-ol (preparation described in application Serial No. 771,136, now U. S. Patent 2,566,336), 15 cc. of methyl iodide and 15 cc. of benzene was heated in a sealed tube at 95–100° C. for eight hours. The mixture was then treated as described in Example I. After acid hydrolysis of the addition product, the material was made alkaline with ammonium hydroxide and extracted with chloroform. The 17-methylamino-5-androstene-3β-ol crystallized from the concentrated chloroform solution. It was further purified by converting it to the hydrochloride which was recrystallized from methanol. Regeneration of the free base from the hydrochloride and subsequent crystallization of the base from chloroform gave pure material melting at 209–210° C.

EXAMPLE IX

*23-benzalimino-5-norcholene-3β-ol*

The crude primary amine prepared from 10 g. of 3-acetoxy-5-cholenic acid by the Curtius degradation was dissolved in 100 cc. of methanol and treated with 4.0 g. of potassium hydroxide in 20 cc. of water. After boiling the solution under reflux for one hour, 4.0 cc. of benzaldehyde was added and then heating was continued for another thirty minutes. Upon cooling, 6.9 g. of crystalline material separated. After recrystallization from methanol, the 23-benzalimino-5-norcholene-3β-ol, fine, glossy needles, melted at 88–91°, solidified and then remelted at 139–141°.

EXAMPLE X

*23-methylamino-5-norcholene-3β-ol*

A mixture of 2.4 g. of 23-benzalimino-5-norcholene-3β-ol, 4 cc. of benzene and 4 cc. of methyl iodide was heated in a sealed tube at 95–100° C. for four hours. The quaternary salt, 2.8 g., M. P. 230–235° C., solidifying and remelting at 260–265° C., was separated by filtration of the cooled mixture. It was decomposed in methanol acidified with hydrochloric acid, made alkaline and extracted with chloroform. The crude amine crystallized from the concentrated chloroform extract upon the addition of petroleum ether (B. P. 35–60° C.). It was further purified by carrying through the hydrochloride. 23-methylamino-5-norcholene-3β-ol regenerated from the salt, melted at 166–167°.

EXAMPLE XI

*23-methylamino-norcholane-3α,12α-diol*

Desoxycholic acid, 3α,12α-dihydroxycholanic acid, was acetylated according to the method of Whitman and Schwenk (J. Am. Chem. Soc., 68, 1865 (1946)). The diacetoxy acid was then carried through the acid chloride and azide to the primary amine, 23-amino-norcholane-3α,12α-diol diacetate. The crystalline amine was then treated with benzaldehyde and the resulting benzal derivative, an oil, was heated in benzene solution with methyl iodide as described in Example I. The quaternary derivative was then hydrolyzed and the methylamine, 23-methyl-amino-norcholane-3α,12α-diol, was isolated from the alkalinized hydrolysis solution.

EXAMPLE XII

*20-methylamino-5-pregnene-3β-ol*

A solution of 20-benzalimino-5-pregnene-3β-ol in benzene containing methyl chloride was heated in a closed tube at 95–100° C. for four hours. The resulting quaternary chloride was then processed as described in Example I. There resulted, after purification, 20-methylamino-5-pregnene-3β-ol, M. P. 225–226° C.

EXAMPLE XIII

*Bisnorcholane-3β-ol-22-al*

Instead of directly treating 3-acetoxy-bisnorcholanylamine with hypochlorous acid, as in Example 4 of U. S. Patent No. 2,286,892, the product obtained by the Curtius degradation of 3-acetoxy-norcholanic acid is first hydrolyzed with alkali and after removal of alkali the free hydroxy-bisnorcholanylamine is reacted with p-brombenzaldehyde to form the Schiff's base. The Schiff's base is then treated with methyl iodide and the quaternary imine hydrolyzed to the 22-methylamino-bisnorcholane-3-ol hydriodide. The free amine is then treated with sodium hypochlorite as in either of Examples V or VII to give the bisnorcholane-3-ol-22-al.

The invention is not limited to the treatment of the particular steroids treated in the foregoing examples, but is applicable to the treatment of any steroid compound having a primary amino group attached to a carbon atom having a hydrogen atom also attached thereto. In practice, however, the compounds which will ordinarily be treated will be those of the structural formula

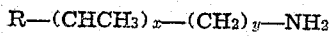

where $x$ is zero or one, $y$ is zero, one or two, and $x$ is zero when $y$ is zero, R is a cyclopentanopolyhydrophenanthrene radical, and the substituent radical —$(CHCH_3)_x$—$(CH_2)_y$—$NH_2$ is attached to the 17-carbon atom of the nucleus, since steroids possessing the

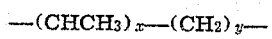

radical, as defined, occur in nature or are readily derivated from naturally occurring steroids.

The term "hypochlorite" is intended to include both hypochlorous acid and the alkali metal hypochlorites unless the contrary specifically appears.

The term "Decker's method" is intended to refer to the method of Decker and Becker, Ann. 395, 362–367 (1913) for converting primary amines to secondary amines, and consists in the condensation of the primary amine with an aldehyde to form a Schiff's base, followed by addition of alkyl halide to the Schiff's base formed and subsequent hydrolysis to yield the secondary amine.

Having described the invention, what is claimed is:

1. The process which comprises converting a primary steroid amine having the amine group attached to a carbon atom carrying a hydrogen atom to a secondary methyl amine by condensing the steroid amine with an aldehyde to form a Schiff's base, treating the Schiff's base with a methyl halide, and hydrolyzing the resulting quaternary halide, treating the secondary amine with hypochlorite to form the monochloramine, removing the elements of HCl from the chloramine and hydrolyzing the resulting imine to form a carbonyl-containing steroid in which the carbon atom initially bearing the —NH₂ group now bears double bonded oxygen.

2. The process which comprises converting a steroid amine of the structural formula

R—(CHCH₃)ₓ—(CH₂)ᵧNH₂ wherein R is a polyhydrocyclopentanophenanthrene nucleus, x is selected from the group consisting of zero and one, and y is selected from the group consisting of zero, one and two, said compounds being further characterized in that the group —(CHCH₃)ₓ—(CH₂)ᵧNH₂ is attached to the 17-carbon atom of the steroid nucleus and in that when x is zero y is zero, to a secondary methyl amine by condensing the steroid amine with an aldehyde to form a Schiff's base, treating the Schiff's base with a methyl halide, and hydrolyzing the resulting quaternary halide, treating the secondary amine with hypochlorite to form the monochloramine, removing the elements of HCl from the chlorimine and hydrolyzing the resulting imine to form a carbonyl-containing steroid in which the carbon atom initially bearing the —NH₂ group now bears double bonded oxygen.

3. The process which comprises converting a 20-primary amino-steroid to a secondary methyl amine by condensing the steroid amine with an aldehyde to form a Schiff's base, treating the Schiff's base with a methyl halide, and hydrolyzing the resulting quaternary halide, treating the secondary amine with hypochlorite to form the monochloramine, removing the elements of HCl from the chlorimine and hydrolyzing the thus formed imine to form a 20-keto-steroid.

4. The process which comprises converting a primary 17-amino-steroid to a secondary methylamine by condensing the steroid amine with an aldehyde to form a Schiff's base, treating the Schiff's base with a methyl halide, and hydrolyzing the resulting quaternary halide, treating the secondary amine with hypochlorite to form a monochloramine, removing the elements of HCl from the chloramine and hydrolyzing the resulting imine to form a 17-keto-steroid.

5. The process which comprises converting a 23-primary amino steroid to a steroid methyl amine by condensing the steroid amine with an aldehyde to form a Schiff's base, treating the Schiff's base with a methyl halide, and hydrolyzing the resulting quaternary halide, treating the secondary amine with hypochlorite to form the monochloramine, removing the elements of HCl from the chloramine and hydrolyzing the resulting imine to form a 23-carbonyl-steroid.

6. The process of claim 3 in which the starting compound is a Δ⁵-ternorcholenylamine.

7. The process of claim 3 in which the starting compound is 3-hydroxy-Δ⁵-ternorcholenylamine.

8. The process of claim 4 in which the starting compound is a Δ⁵-etiocholenylamine.

9. The process of claim 5 in which the starting compound is a Δ⁵-norcholenylamine.

10. The process of claim 5 in which the starting compound is a saturated norcholanylamine.

11. The process which comprises treating a steroid compound of the formula

R—(CHCH₃)ₓ—(CH₂)ᵧ—NHCH₃ wherein R is a polyhydrocyclopentanophenanthrene radical, x is selected from the group zero and one, y is selected from the group consisting of zero, one and two, said compounds being further characterized in that the

—(CHCH₃)ₓ—(CH₂)ᵧ—NHCH₃ group is attached to the 17-carbon atom of the steroid nucleus, and in that when x is zero, y is zero, with an alkali metal hypochlorite to form an imine and hydrolyzing the steroid imine to a carbonyl-containing steroid in which the carbon atom initially bearing the —NHCH₃ group now bears double bonded oxygen.

12. Steroid compounds of the structural formula R—(CHCH₃)ₓ—(CH₂)ᵧ—NHCH₃, wherein R is a cyclopentanopolyhydrophenanthrene radical, x is selected from the group consisting of zero and one, and y is selected from the group consisting of zero, one and two, said compounds being further characterized in that the

—(CHCH₃)ₓ—(CH₂)ᵧ—NHCH₃ group is attached to the 17-carbon atom of the steroid nucleus and in that when x is zero y is zero.

13. 20-methylamino-steroids.

14. 17-methylamino-steroids.

15. 23-methylamino-steroids.

16. Steroids having a radical containing a methylamino group, said radical being attached to the 17-carbon atom of the steroid nucleus.

17. 20-methylamino-ternorcholenes.

18. 20-methylamino-3-hydroxy-Δ⁵-ternorcholene.

19. 17-methylamino-3-hydroxy-Δ⁵-androstene.

20. The process which comprises treating a steroid compound of the formula

R—(CHCH₃)ₓ—(CH₂)ᵧ—NHCH₃ wherein R is a polyhydrocyclopentanophenanthrene radical, x is selected from the group zero and one, y is selected from the group consisting of zero, one and two, said compounds being further characterized in that the

—(CHCH₃)ₓ—(CH₂)ᵧ—NHCH₃ group is attached to the 17-carbon atom of the steroid nucleus, and in that when x is zero, y is zero, with hypochlorite to form the monochloramine, removing the elements of HCl from the chloramine to form an imine, and hydrolyzing the resulting imine to form a carbonyl containing steroid in which the carbon atom initially bearing the —NHCH₃ group now bears double bonded oxygen.

PERCY L. JULIAN.
EDWIN W. MEYER.
RALPH SCHROEDER.
ARTHUR MAGNANI.

REFERENCES CITED

The following references are of record in the file of this patent:

UNITED STATES PATENTS

| Number | Name | Date |
|---|---|---|
| 2,108,646 | Bockmuhl | Feb. 15, 1938 |
| 2,188,870 | Bockmuhl | Jan. 30, 1940 |
| 2,289,235 | Bockmuhl | July 7, 1942 |
| 2,292,080 | Marker | Aug. 4, 1942 |
| 2,430,467 | Julian | Nov. 11, 1947 |

OTHER REFERENCES

Johes et al.: Jour. Chem. Soc., 665-670, 1946.